United States Patent
Medhurst

[15] 3,651,780
[45] Mar. 28, 1972

[54] ROTARY INSTRUMENTS FOR INDICATING LINEAR MEASUREMENTS

[72] Inventor: Cyril W. Medhurst, Woking, England

[73] Assignee: British Aircraft Corporation, London, England

[22] Filed: Oct. 8, 1969

[21] Appl. No.: 864,838

[30] Foreign Application Priority Data

Oct. 25, 1968 Great Britain..................50,852/68

[52] U.S. Cl............................................116/115.5, 33/126
[51] Int. Cl.................................................B23q 17/00
[58] Field of Search................116/115, 115.5, 124; 33/126; 74/10, 813

[56] References Cited

UNITED STATES PATENTS

| | | | |
|---|---|---|---|
| Re. 26,527 | 2/1969 | Rabinow | 116/115.5 |
| 1,027,549 | 5/1912 | Kronert | 116/115.5 UX |
| 1,444,565 | 2/1923 | Smith | 33/126 |
| 3,418,965 | 12/1968 | Rabinow | 116/115.5 |
| 3,536,030 | 10/1970 | Schroeder | 116/115.5 |

Primary Examiner—Louis J. Capozi
Attorney—Sughrue, Rothwell, Mion, Zinn & Macpeak

[57] ABSTRACT

A compact rotary dial unit for accurately measuring small movements of a machine-tool lead-screw, the unit having one continuous decimally divided scale which indicates the measurement in either the metric or the inch system, as initially selected by the operator; the unit encloses an epicyclic gearing which when changed from a nonoperating to an operating condition causes a change (simply related to 2.54) in the rotation speed of the scale.

12 Claims, 8 Drawing Figures

ROTARY INSTRUMENTS FOR INDICATING LINEAR MEASUREMENTS

This invention relates to rotary instruments for indicating linear measurements in English and Metric units alternatively. It is particularly concerned with such instruments for indicating the extent of linear movements imparted by rotary movement of a lead screw, e.g., in a machine tool. Rotary instruments with cylindrical scales, otherwise known as dial units, which measure linear displacement in terms of rotation of a lead screw, are employed on a number of different types of machine tools. Generally speaking, such dial units have a scale reading in English units or a scale reading in Metric units. With the increasing use of the Metric system in English speaking countries, the requirement to change a tool over from operation in the one system to operation in the other, and back again, is occurring more frequently. It is not practicable simply to provide two separate scales, one in English and one in Metric units, rotating at the same speed, because one revolution of each scale must correspond with a decimal number (1, 10, 100 etc.) of units of length if the scale is to be easily readable after completion of more than one revolution, and the ratio between the English and metric units (inch:centimeter) is 1:2.54. Provision of two scales side by side and geared together can be difficult because of the lack of space in many machine tools. The presence of two simultaneously visible scales might also confuse the operator.

It is an object of the present invention to provide a rotary instrument or dial unit of compact construction, having a scale capable of easy and rapid conversion from reading in English units to metric units, and vice versa.

According to the present invention, a rotary instrument for indicating linear measurement in English and metric units alternatively, comprises an epicyclic gearing which has three main components, namely a planet-carrier carrying planet wheels, a sun gear, and an internally toothed ring gear, both of the latter components meshing with the planet wheels, one of the three components being adapted to be secured on a shaft, the rotational movement of which is proportional to a linear movement to be measured, a second one of the three components carrying a scale which is read against a relatively fixed mark, and there being means for clamping the third of the components alternatively to one of the other components or to the stationary member, so that the component carrying the scale will rotate either at the same speed as the shaft, or at a fixed velocity ratio thereto, the gearing being such that the said ratio corresponds to or bears a simple relation to, the ratio between English and metric units of length.

By means of the invention, a complete revolution of the scale-carrying member can correspond to either of two selectable axial linear movements, the one movement being a simple inch-based unit, and the other a simple metric unit.

The clamping means may comprise frictionally engageable surfaces which act as clutches, the changeover from clamping the third component to another component of the gearing, to clamping it to the stationary member, being effected by shifting the third component axially.

Preferably this axial shifting movement is effected manually by partially rotating an external ring member which is arranged to move axially on such partial rotation, the ring member carrying two marks against either of which the scale can be read together with indications of which unit is appropriate to each mark, only one such mark and indication being visible to the operator at one time.

The compact construction made possible by the invention enables the instrument in many cases to be fitted in place of an existing dial unit reading in only one system of length units.

Various embodiments of the invention will now be described in more detail by way of example and with reference to the accompanying drawings, in which.

The embodiments shown in the accompanying drawings are intended for use on machine tools, adjacent to a hand-wheel indicated at W, for indicating the linear displacement imparted to an element of the machine tool by rotation of the hand-wheel W and of a lead screw (not shown) to which it is connected by the shaft S.

Figure 1:
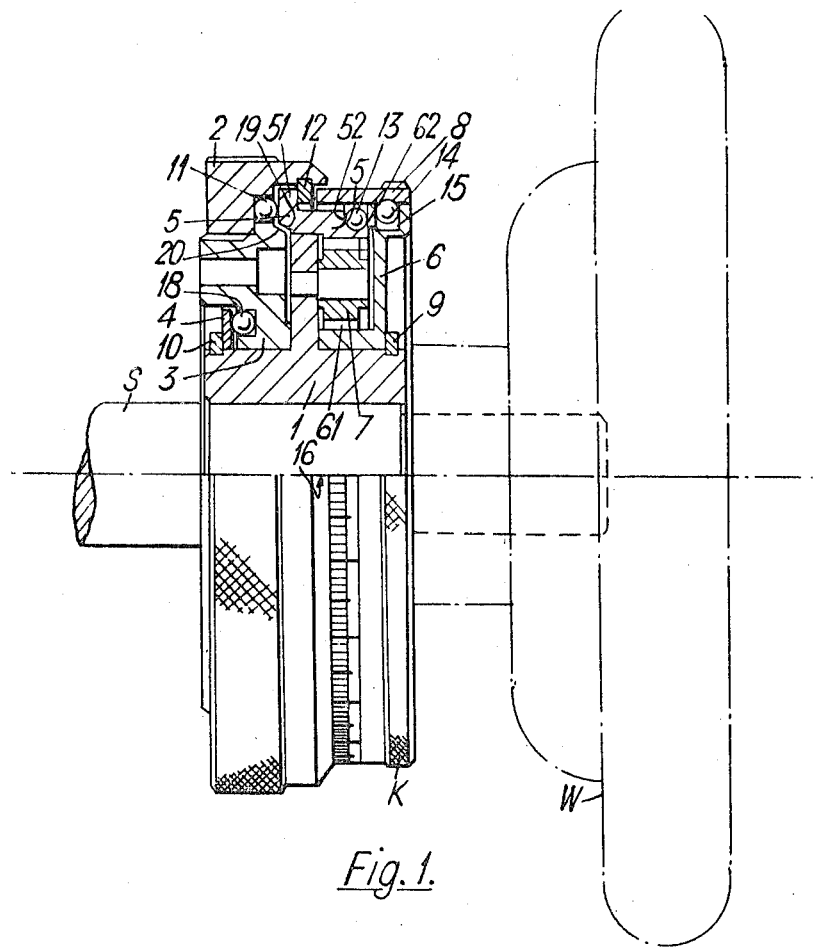
FIG. 1 is a part-section part-plan view of a rotary instrument or dial unit according to the invention, adjusted to measure in inches.
Figure 1A:
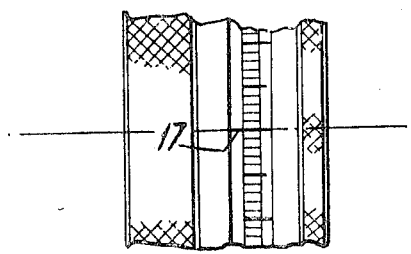
FIG. 1a is a scrap view of the dial unit adjusted to measure in millimeters.

In the embodiment shown in FIGS. 1 and 1a, a planet-carrier 1 is mounted on the shaft S for rotation therewith. Planet wheels 7 carried by the planet carrier 1 mesh with an internally toothed ring gear 5 and with a sun gear 61 formed on a member 6 which also carries a cylindrical graduated scale 8. The scale 8 is held from rotation with respect to the member 6 by means of friction devices (preferably two in number) each comprising a ball 14 pressed outwards into an annular recess in the underside of the scale 8 by means of a rubber pressure pad 15 accommodated in a pocket in the member 6. An annular backing member 3 is held stationary by bolts (not shown) screwed into a stationary part of the machine tool. A knurled unit-selector ring 2 is rotatable on the backing member 3 through approximately half a turn, such partial rotation being accompanied by a slight axial movement due to a screw thread engagement between the unit-selector ring 2 and the backing member 3.

The ring gear 5 is arranged for axial movement with the selector ring 2. A thrust bearing comprising balls 11 is interposed between the selector ring 2 and the left-hand side of an outwardly extending flange 51 on the ring gear 5 while a lock ring 12 projecting inwardly from the right-hand end of the selector ring 2 is arranged to bear against the right-hand side of the flange 51, a small amount of play being allowed to ensure that when the flange 51 is engaged by the balls 11 it is free from the lock ring 12.

The ring gear 5 has a conical face 19 capable of engaging a corresponding conical face 20 on the backing member 3. It also carries a resilient O-ring 13 capable of engaging a surface 62 on the sun gear carrying member 6. These two combinations serve as clutches respectively for Metric and English measurements.

The sun gear carrying member 6 is retained on the planet-carrier 1 by a circlip 9, while the planet-carrier 1 is restrained from axial movement by a thrust washer 4 which is retained by a circlip 10 and engages a ball bearing 18 in the stationary backing member 3. In FIG. 1 the resilient O-ring 13 is shown compressed between a surface 52 on the internal ring gear 5 and the surface 62 on the sun gear carrying member 6. The O-ring 13 engages the surfaces 52 and 62 in this way only so long as the selector ring 2 is in the rightward position shown, and is exerting pressure on the ring gear 5 via the balls 11.

In this position, the components 5, 6 and 7 of the epicyclic gearing are locked together so that the member 6 which carries the scale 8 rotates at the same speed as the planet-carrier 1 and the shaft S. The selector ring 2 presents to the operator a mark 16 and an indication (only partly shown) that the scale is reading in thousandths of an inch.

If the selector ring 2 is now rotated through 180°, thereby shifting the selector ring 2 and the ring gear 5 to the left and releasing the engagement of the O-ring 13 between surfaces 52 and 62, the conical surface 19 on the internal ring gear 5 will engage the conical surface 20 on the back-plate 3. The internal ring gear 5 will then be locked to the stationary part of the machine tool by reason of the pressure exerted via the lock ring 12. Rotation of the shaft S and planet-carrier 1 now causes rotation of the sun gear 61 and hence of the scale 8 at increased speed. The numbers of teeth on the ring gear 5 and the sun gear 61 are chosen in the ratio 154/100 so as to give a velocity ratio of 2.54 to 1. At the same time the selector ring 2 now presents to the operator a second mark 17 (FIG. 1a) and an indication that the same scale now reads in hundredths of a millimeter.

Zero setting may be achieved by rotating the scale 8 by means of its knurled ring K, the friction devices formed by the balls 14 and rubber pressure pads 15 being arranged to slip at a convenient torque figure.

It may not always be convenient to have the scale rotating at 2.54 times normal speed when operating on the metric system. The instrument shown in FIGS. 2 and 2a has been designed to overcome this difficulty.

In this embodiment of the invention, the planet-carrier 21 is again mounted on the shaft S, but it carries pairs of coupled planet-wheels 29, 30, of different diameters. The larger diameter planet-wheels 29 mesh with the sun gear 25 which is formed on an axially shiftable member 31. The smaller diameter planet-wheels 30 mesh with an internal ring gear 44 on a scale-carrying member 32. Conical surfaces 33, 34 on the member 31 are arranged to cooperate alternatively with similar surfaces on the planet-carrier 21 and on an inwardly extending flange 26 on the selector ring 35, respectively. The selector ring 35 is rotatable through 180° on the backing member 36, and is screw-threaded thereon so as to cause such rotation to be accompanied by a small axial movement. The backing member 36 is held stationary by a dowel peg 38 fitting into a corresponding recess in a stationary part of the machine tool. The assembly is retained as before by circlips 39, 40 on the planet-carrier 21, engaging the outer faces of thrust bearings 41, 42.

The scale 43 is visible through one of two windows 27, 28 in the selector ring 35, according to the position of the latter. On the right-hand side of the graduations are shown figures for use in inch measurements, and on the left figures for metric measurements. The windows 27, 28 are offset, as can be seen by comparison of FIGS. 2 and 2a, so that the appropriate set of figures only can be seen. The windows 27, 28 carry respective marks 23, 24 for reading the scale 43.

Figure 2:
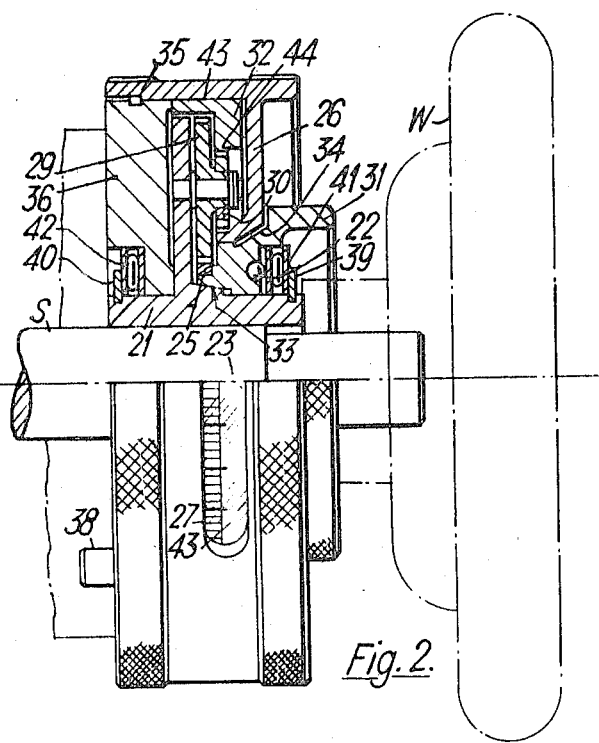
FIG. 2 and 2a are similar views of another embodiment of the invention.

A resilient O-ring 22 under compression between the axially shiftable member 31 and thrust bearing 41 urges the member 31 to the left into the position shown in FIG. 2, in which the member 31 carrying the sun gear 25 engages the planet-carrier 21 through the conical surface 33 so that the gearing is locked and the member 32 carrying the internal ring gear 44 and the scale 43 rotates with the shaft S.

Rotation of the selector ring 35 through 180° shifts the ring 35 to the right and thereby clamps the members 31 stationary through conical surface 34 and releases it from planet-carrier 21. The coupled planet-wheels are so dimensioned that the member 32 carrying the scale 15 is then rotated at a velocity ratio of 1.27:1 i.e., (2.54/2) : 1. Thus the scale reads either in 0.001-inch divisions or 0.02-millimeter divisions.

Zero setting can be achieved by rotation of member 31, slipping the cone clutches 33, 34.

An alternative instrument, not shown, incorporates the principle of having coupled concentric planet gears of different diameters, but having the scale carried by the sun gear, the axially movable component being the ring gear, in the manner seen in FIG. 1. The scale can be caused to rotate at any reasonable rate faster than or slower than it would were there only one planet gear, by suitably selecting the relative diameters of the two planet gears.

Figure 2A:
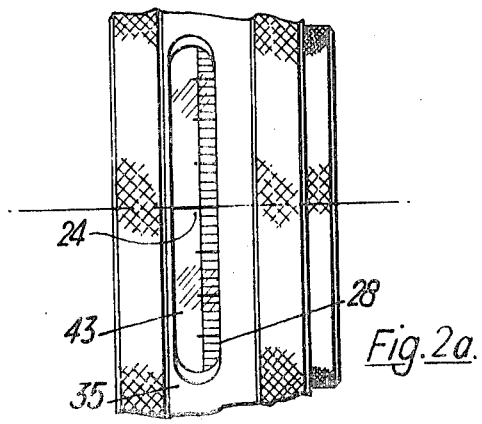
Figure 3:
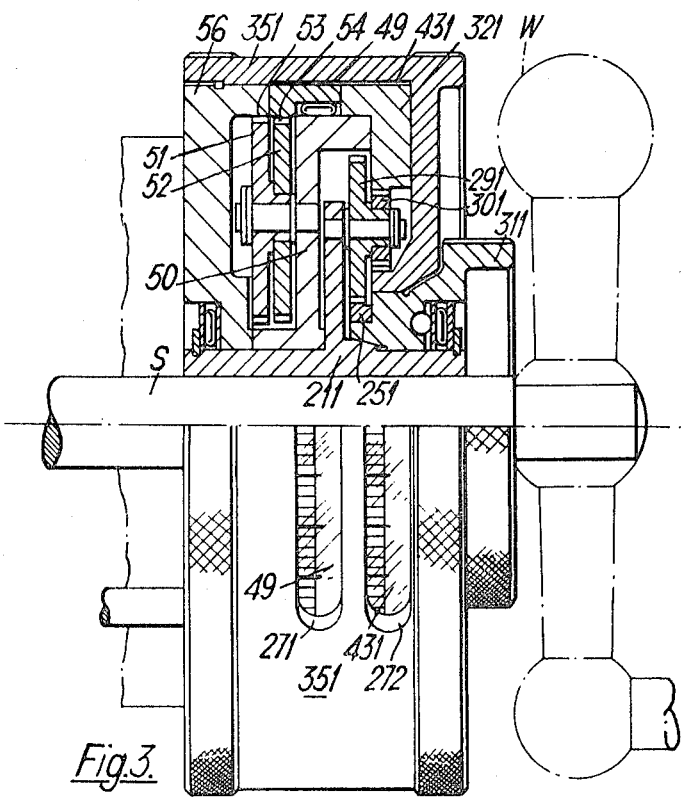
FIGS. 3 and 3a are similar views of a further modification.
Figure 3A:
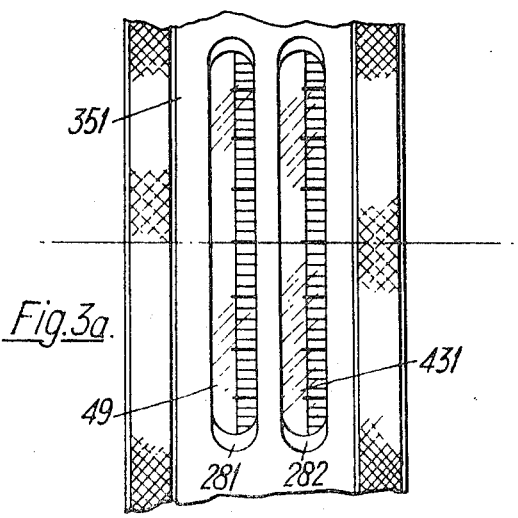

FIGS. 3 and 3a show a modification of the embodiment of FIGS. 2 and 2a. The planet-carrier 211, planets 291, 301, axially shiftable member 311 carrying sun gear 251, scale-carrying member 321 carrying the fine-scale 431, and selector ring 351 are all similar to those described with reference to FIGS. 2 and 2a and operate in the same manner. In addition, a second scale 49 indicating the aggregate or coarse setting is included. For this purpose a second epicyclic gearing is incorporated, having a planet-carrier 50 secured to the fine scale carrying member 321, coupled pairs of planet-wheels 51, 52 and an internal ring gear 53 on the stationary backing-member 56 meshing with planets 51. Planets 52 are caused to rotate slowly with planets 51 as the planet-carrier 50 rotates, and mesh with a second internal ring gear 54 on an annular member 55 carrying the second scale 49. Planets 52 have a slightly lesser number of teeth than planets 51 and so drive the member 55 with a high reduction. The gearing may be arranged so that the velocity ratio between the scale-carrying members 321 and 55 is 100: 1, for example. Pairs of windows 271,272 and 281,282 are provided in the selector ring 351 for viewing the inch and metric scales respectively.

Figure 4:
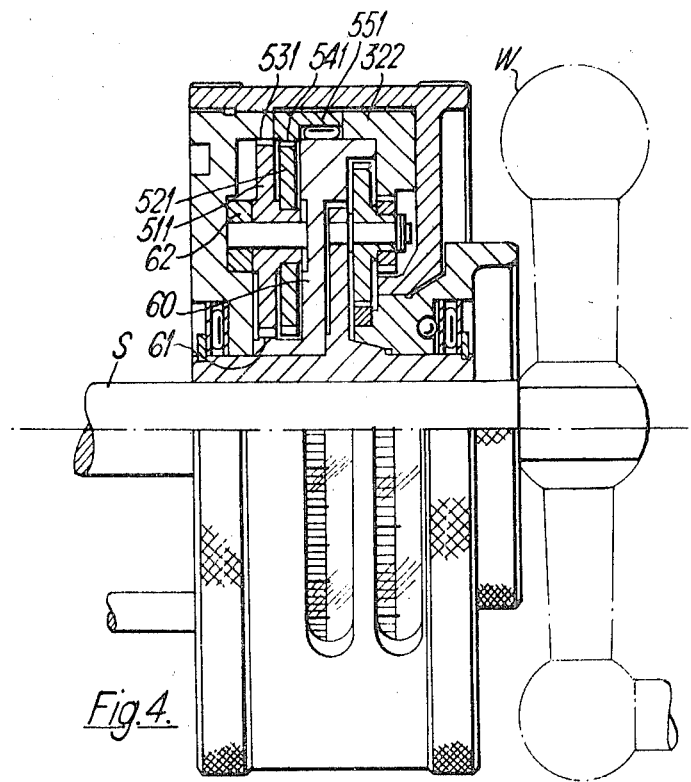
FIGS. 4 and 4a are similar views of yet another modification.
Figure 4A:
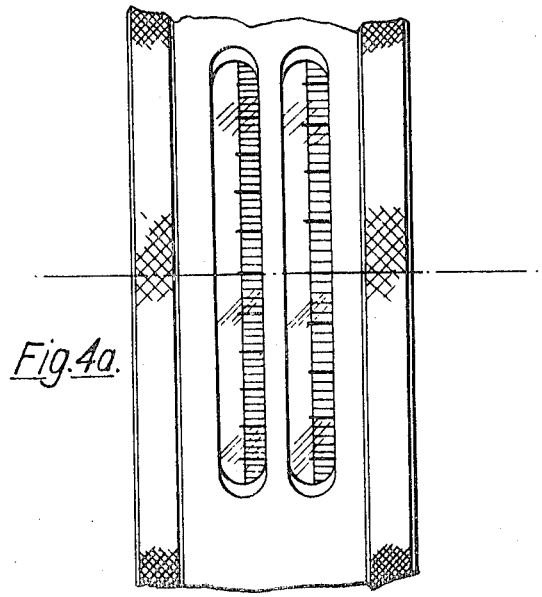

FIGS. 4 and 4a show a modification of the embodiment of FIGS. 3 and 3a, in which the velocity ratio between the fine and coarse scales is further increased by omitting the second planet-carrier 50 of FIG. 3 and replacing it by a rotatable annular member 60 which connects the fine scale carrying member 322 to a further sun wheel 61 meshing with planets 511, which also mesh with the stationary ring gear 531 as before. The planets 511, 521 are mounted on a free annular carrier 62 which rotates slowly as member 322 rotates. Planets 521 mesh with internal ring gear 541 on the member 551 carrying the second scale 491 and drive it with a high reduction. With this arrangement, the velocity ratio between the members 322 and 551 may be as high as 250:1 or even 400:1.

The features seen in FIGS. 3 and 4, namely of having second epicyclic gearings to provide coarse readings can be incorporated into the arrangement seen in FIGS. 1 and 1a, by arranging the sun gear (the scale-carrying member) either to mesh with one of a pair of planet gears of slightly different diameters as seen in FIGS. 4 and 4a, or to carry a further planet carrier having two planet gears, as seen in FIGS. 3 and 3a.

I claim:

1. A rotary instrument for indicating linear movements of a movable member in English and metric measurement units alternatively, the instrument comprising a rotatable shaft which is operatively connected to the movable member such that the rotational movement thereof is proportional to the linear movement of the movable member; an epicyclic gearing which has a planet-carrier carrying planet gear wheels, a sun gear, an internally toothed ring gear; said sun gear and said ring gear being in meshing engagement with said planet wheels, said planet carrier being secured to said shaft, one of said sun gear and said ring gear carrying a scale; a stationary member; and means for clamping the other of said sun gear and said ring gear alternatively to said planet-carrier or said one of said gears so that the latter will rotate at the same speed as said shaft, or to said stationary member so that said one of said gears will rotate at a fixed velocity ratio relative to said shaft, the gear ratios of said gear wheels, said sun gear and said ring gear being such that the said velocity ratio corresponds to or bears a simple relation to the ratio between English and metric units of length, said clamping means comprising a mark against which said scale can be read.

2. An instrument according to claim 1, in which the clamping means comprise frictionally engageable surfaces which act as clutches between said planet carrier, said sun gear, said ring gear and/or said stationary member, the changeover from clamping the other of said gears to said planet-carrier or the one of said gears, to clamping it to the stationary member, being effected by shifting the other of said gears axially.

3. An instrument according to claim 2, wherein said clamping means comprises an external selector ring member mounted for rotational and axial movement on said stationary member, and the axial shifting movement of the other of said gears is performed manually by partially rotating said external selector ring member, the ring member carrying two marks against either of which the scale can be read, there being respective indications of which unit is appropriate to each mark, only one such mark and indication being visible to the operator at one time.

4. An instrument according to claim 1 in which the scale is carried by the sun gear, and the ring gear is the other of said gears.

5. An instrument according to claim 1 in which the ring gear carries the scale, and the sun gear is the axially movable component.

6. An instrument according to claim 1 in which there are two concentric planet gears of different diameters which are rigidly coupled for rotation, one planet gear meshing with the axially shiftable member, and the other with the gear member which carries the scale.

7. An instrument according to claim 6 in which the sun gear is axially movable and meshes with the larger planet gear, and ring gear carries the scale and meshes with the smaller planet gear.

8. An instrument according to claim 7 in which the scale carries two series of graduations which are axially spaced from one another, and the selector ring member is a partially rotatable sleeve, the rotation of which axially moves the movable member, the sleeve having two circumferentially spaced windows, each of which exposes the scale appropriate to the angular setting of the sleeve and the consequent axial position of the said movable member.

9. An instrument according to claim 1 in which there is a further planet-carrier secured to the scale carrying ring, the further planet-carrier carrying two further rigidly coupled concentric planet gears of slightly different diameters, the larger of which meshes with a stationary ring gear, and the smaller of which meshes with a movable ring gear which carries a further scale.

10. An instrument according to claim 1 in which the scale-carrying ring is coupled to a further sun gear with which meshes with slightly larger of a further pair of rigidly coupled planet gears, the larger planet gear also meshing with a stationary outer ring gear, and the smaller planet gear meshing with a further scale-carrying ring.

11. An instrument according to claim 1 in which the scale-carrying one of said gears comprises two parts, one of which carries the scale and has frictional engagement with the other part, which carries the gear teeth thereof, the frictional engagement permitting zero setting of the scale.

12. An instrument according to claim 1 and comprising a unit selector which is mounted to be frictionally and partially rotated about the stationary member and which carries two spaced marks against which the scale can be read.

* * * * *